United States Patent
Tewani et al.

(10) Patent No.: US 7,159,855 B2
(45) Date of Patent: Jan. 9, 2007

(54) HYDRAULIC MOUNT WITH RECIPROCATING SECONDARY ORIFICE TRACK-MASS

(75) Inventors: Sanjiv G. Tewani, Lebanon, OH (US); Mark W. Long, Bellbrook, OH (US); Mark O. Bodie, Dayton, OH (US); Ronald A. Beer, Fairborn, OH (US); James P. Hamberg, Tripp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 369 days.

(21) Appl. No.: 10/289,925

(22) Filed: Nov. 7, 2002

(65) Prior Publication Data

US 2004/0089989 A1 May 13, 2004

(51) Int. Cl.
*F16F 9/00* (2006.01)

(52) U.S. Cl. .................................. 267/140.13; 267/219

(58) Field of Classification Search ........... 267/140.11, 267/140.12, 140.13, 140.14, 141.1, 219, 267/293

See application file for complete search history.

(56) References Cited

U.S. PATENT DOCUMENTS

| | | | |
|---|---|---|---|
| 4,588,173 A | 5/1986 | Gold et al. | |
| 4,611,782 A * | 9/1986 | Ushijima et al. | 267/140.13 |
| 5,085,058 A * | 2/1992 | Aaron et al. | 62/324.6 |
| 5,246,211 A | 9/1993 | Klein et al. | |
| 5,370,375 A * | 12/1994 | Kojima | 267/140.14 |
| 5,374,039 A * | 12/1994 | Schmidt et al. | 267/140.13 |
| 5,439,082 A * | 8/1995 | McKeown et al. | 267/140.14 |
| 5,788,372 A * | 8/1998 | Jones et al. | 267/136 |
| 6,050,554 A * | 4/2000 | Tournier | 267/140.11 |
| 6,056,279 A * | 5/2000 | Lee et al. | 267/140.13 |
| 6,199,840 B1 * | 3/2001 | Yano | 267/140.12 |
| 6,302,385 B1 | 10/2001 | Summers, III et al. | |
| 6,361,031 B1 | 3/2002 | Shores et al. | |
| 6,382,267 B1 | 5/2002 | Childers et al. | |
| 6,412,761 B1 | 7/2002 | Baudendistel et al. | |
| 6,422,545 B1 | 7/2002 | Baudendistel et al. | |
| 6,439,556 B1 | 8/2002 | Baudendistel et al. | |
| 6,454,249 B1 | 9/2002 | Childers et al. | |
| 6,485,005 B1 | 11/2002 | Tewani et al. | |
| 6,499,729 B1 | 12/2002 | Walterbusch | |
| 6,547,226 B1 | 4/2003 | Shores et al. | |
| 6,622,995 B1 | 9/2003 | Baudendistel et al. | |
| 2003/0098532 A1 * | 5/2003 | Tewani et al. | 267/140.11 |

FOREIGN PATENT DOCUMENTS

| | | | |
|---|---|---|---|
| DE | 19959391 | | 5/2001 |
| EP | 0995927 | | 4/2000 |
| FR | 2697603 | | 5/1994 |
| JP | 57076340 A | * | 5/1982 |
| JP | 59231239 | | 12/1984 |
| JP | 60175834 | | 9/1985 |
| JP | 60227032 A | * | 11/1985 |
| JP | 61286632 | | 12/1986 |
| JP | 02209646 A | * | 8/1990 |

* cited by examiner

*Primary Examiner*—Thomas Williams
(74) *Attorney, Agent, or Firm*—Scott A. McBain

(57) ABSTRACT

A hydraulic mount provides passive rate dip performance through use of a secondary orifice track-mass resiliently constrained within a first orifice track for reciprocating movement within the first orifice track under conditions such as engine idle, and constrained against reciprocating motion within the first orifice track for conditions imposing large amplitude, low frequency loads on the mount.

8 Claims, 4 Drawing Sheets

HYDRAULIC MOUNT WITH RECIPROCATING SECONDARY ORIFICE TRACK-MASS

TECHNICAL FIELD OF THE INVENTION

This invention relates to resilient mounts of the type used in motor vehicles, and more particularly to resilient mounts using a hydraulic fluid.

BACKGROUND OF THE INVENTION

It has long been the practice in motor vehicles, such as automobiles and trucks, to suspend engines and other heavy components that generate vibrations when operating on resilient mounts that isolate and damp the vibration from reaching the passenger compartment of the vehicle. It is desirable in such circumstances to provide a mount that is relatively soft for low amplitude higher frequency vibrations, such as those produced while an engine is operating at idle speed. Making the mount too soft, however, results in a structure that may not be capable of damping the motion of a heavy mass, such as the engine, when the vehicle is traveling over a bumpy road.

The competing requirements for a mount that is soft enough to isolate low amplitude vibrations generated by an engine at idle, and yet is robust enough to damp and limit the movement of an engine relative to the vehicle chassis when the vehicle is encountering a bumpy road surface, have caused the designers of resilient mounts to employ hydraulic fluid flowing between multiple chambers within the mount, together with judiciously sized orifice tracks and fluid valve arrangements providing fluid communication between the chambers, to provide mounts that exhibit different dynamic stiffness characteristics dependent upon the magnitude and frequency of the vibratory input to the mount. Such mounts are known as controlled rate dip mounts.

The construction of prior resilient controlled rate dip mounts, has required relatively complicated internal chambering, track configurations, and valve arrangements that result in considerable and undesirable complexity and cost to achieve acceptable rate dip performance of the mount. In addition, physical constraints imposed by prior mount constructions require that compromises be made that result in less than ideal performance of the mount at one or more of the operating conditions.

What is needed, therefore, is an improved resilient mount, offering a more straight-forward construction and improved passive dip rate performance, in comparison to prior hydraulic mounts.

SUMMARY OF THE INVENTION

Our invention provides an improved hydraulic mount through use of a secondary orifice track-mass resiliently constrained within a first orifice track for reciprocating movement within the first orifice track under conditions such as engine idle, and constrained against reciprocating motion within the first orifice track for conditions imposing large amplitude, low frequency loads on the mount.

In one form of our invention, a hydraulic mount includes a resilient hollow body defining a primary and a secondary fluid chamber separated from one another by a partition having a first orifice track therein providing fluid communication between the primary and secondary fluid chambers. The first orifice track has a wall thereof defining a first opening into the primary fluid chamber and a second opening into the secondary fluid chamber. The hydraulic mount also includes a secondary orifice track-mass body disposed within the first orifice track and sealed to the wall of the first orifice track for limited reciprocating movement within the first orifice track. The secondary orifice track-mass body defines a second orifice track therein providing fluid communication through the secondary orifice track-mass body for passage of fluid received from the first fluid orifice track.

The hydraulic mount may include a stop for limiting reciprocating movement of the secondary orifice track-mass body within the first orifice track.

The secondary orifice track-mass body and second orifice track may reciprocate with fluid movement in the first orifice track above a first resonant frequency of the mount, and provide fluid communication for passage of fluid between the primary and secondary fluid chambers at a second resonant frequency of the mount below the first resonant frequency of the mount.

Our invention may also take the form of a method for operating a hydraulic mount having a resilient hollow body defining a primary and a secondary fluid chamber separated from one another by a partition having a first orifice track therein providing fluid communication between the primary and secondary fluid chambers with the first orifice track having a wall thereof defining a first opening into the primary fluid chamber and a second opening into the secondary fluid chamber.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
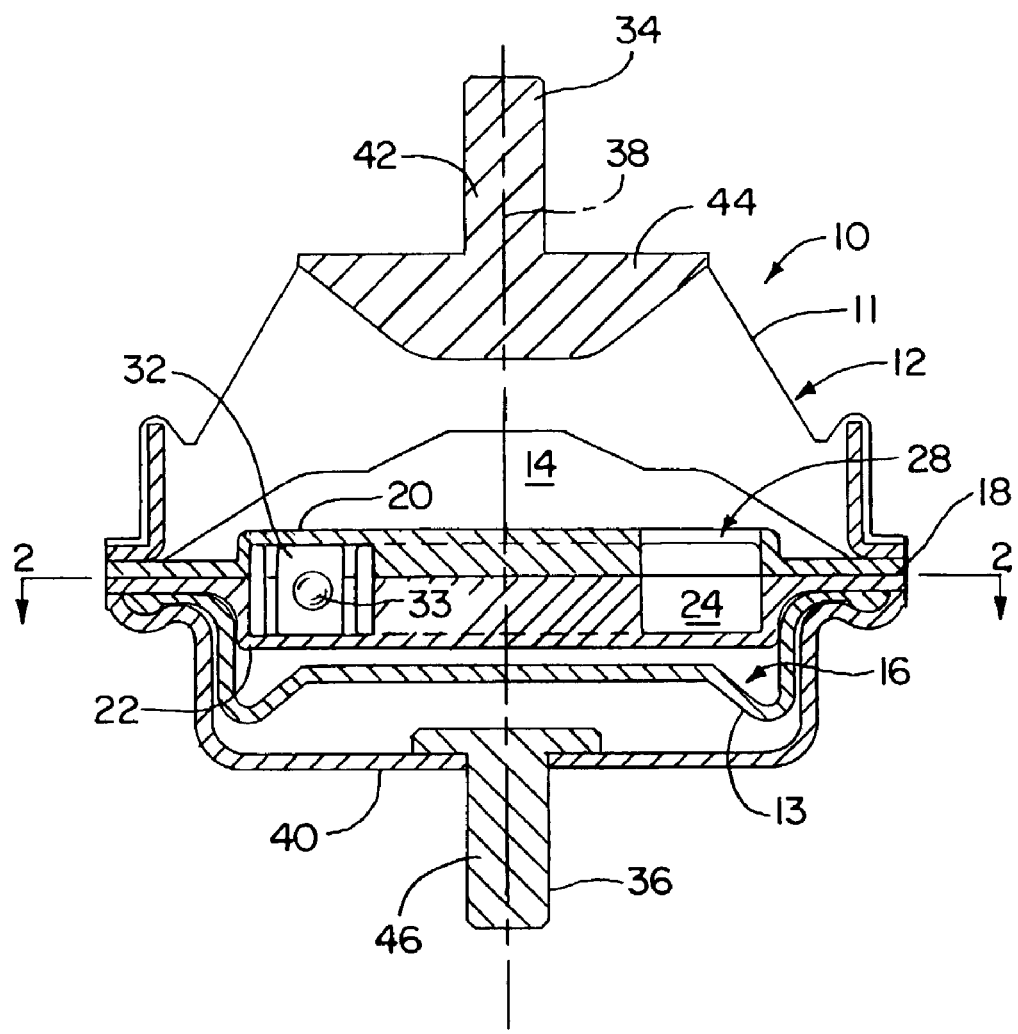
FIG. 1 is a cross section taken along line 1—1 in FIG. 2, showing an exemplary embodiment of a hydraulic mount, according to our invention.

FIG. 1 illustrates an exemplary embodiment of a hydraulic mount 10, according to our invention. The hydraulic mount 10 includes a resilient hollow body 12 defining a primary fluid chamber 14 and a secondary fluid chamber 16, separated from one another by a partition 18 formed by an upper orifice track plate 20 and a lower orifice track plate 22 that are joined together to form the partition 18. The resilient hollow body 12 includes an upper resilient member 11, fabricated from natural rubber or a similar elastomeric material, and a diaphragm 13, also fabricated from natural rubber or a similar elastomeric material. The upper resilient member 11 and the diaphragm 13 are assembled with the partition 18 in a fluid tight manner to form the primary and secondary fluid chambers 14, 16.

Figure 2:
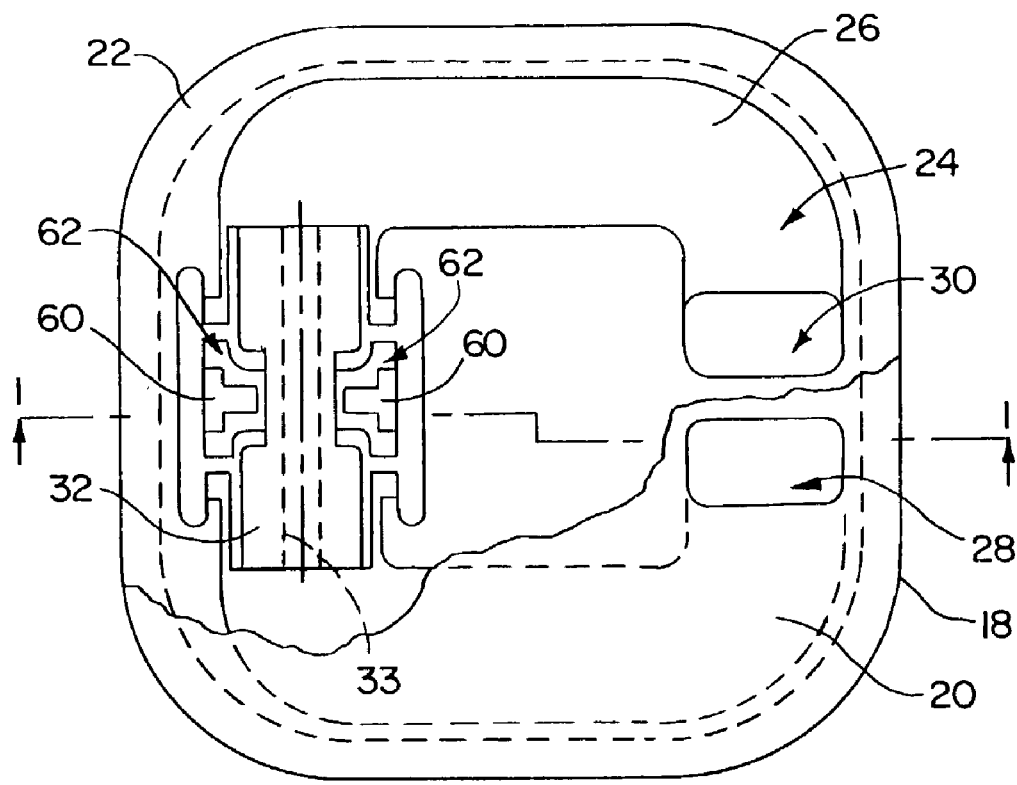
FIG. 2 is a cross section taken along line 2—2 of FIG. 1, showing structural details of a partition and a secondary track-mass body of the exemplary embodiment of a hydraulic mount of FIG. 1.

The upper and lower orifice track plates 20, 22 each include complimentary channels therein, which are aligned when the upper and lower plates 20, 22 are joined together, to define a first orifice track 24, having a wall 26, in the partition 18. As shown in FIGS. 1 and 2, the first orifice track 24 provides fluid communication between the primary and secondary fluid chambers 14, 16, with the wall 26 of the partition 18 defining a first opening 28 into the primary fluid chamber 14 and a second opening 30 into the secondary fluid chamber 16.

A secondary orifice track-mass body 32 is disposed within the first orifice track 24, and sealed to the wall 26 of the first orifice track 24, as described in greater detail below, for limited reciprocating movement within the first orifice track 24. The secondary orifice track-mass body 32 defines a second orifice track therein, in the form of a through bore 33, providing fluid communication through the secondary orifice track-mass body 32 for passage of fluid received from the first fluid orifice track 24. The through-bore 33 in the secondary orifice track-mass body 32 forms an orifice having an effective orifice area smaller than an effective orifice area of the first track 24.

The mount 10 includes a first and a second attachment device 34, 36 disposed along a mount axis 38 extending through the resilient hollow body 12 for receiving a load applied along the mount axis 38. The first attachment device 34 of the mount 10 is in the form of a threaded stud 42 extending from a base 44 that is bonded to the upper end of the resilient hollow body 12. The second attachment device 36 in the exemplary embodiment of the mount 10 is also a threaded stud 46 extending from a mount housing 40 attached to the partition 18.

Figure 3:
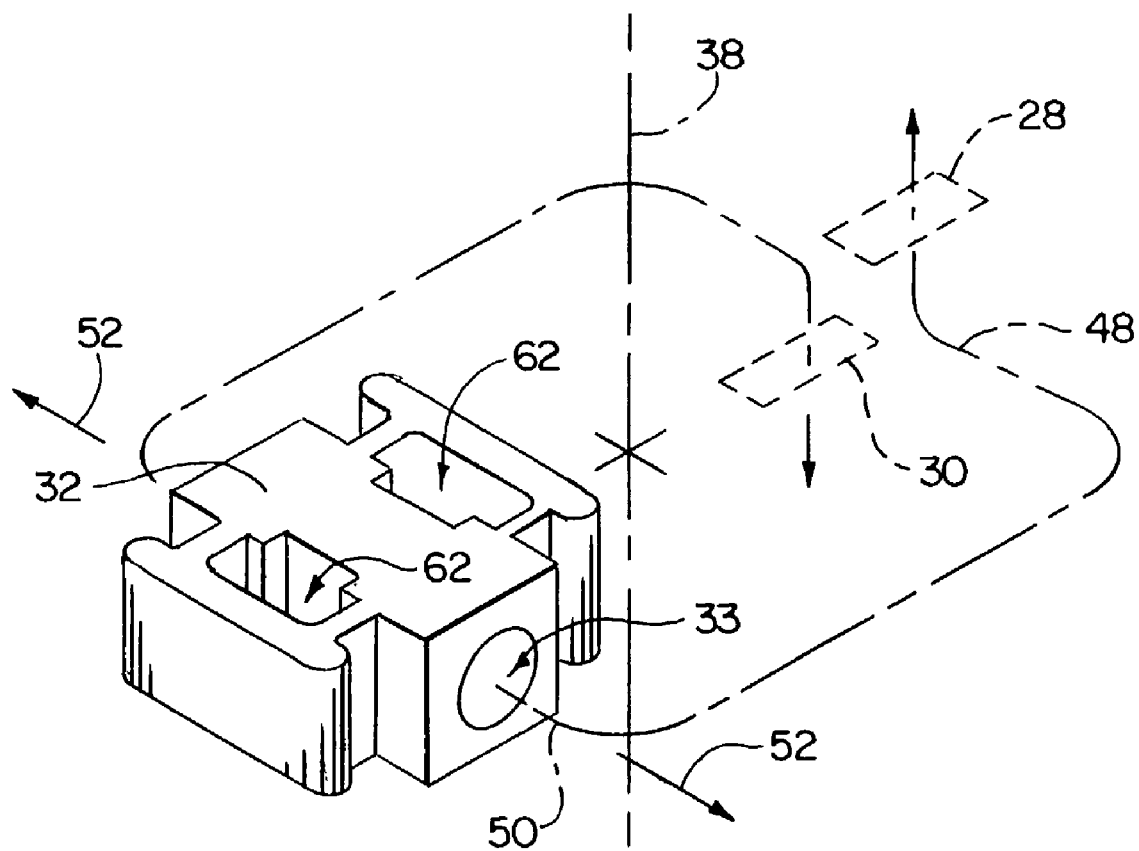
FIG. 3 is a perspective illustration of the flow path for fluid through the mount of FIG. 1.

As shown in FIG. 3, the first orifice track 24 defines a first track axis 48 extending between the first and second openings 28, 30. The first track axis 48 includes a transverse section 50 extending transverse to the mount axis 38, as indicated by arrows 52 that extend in opposite directions from the transverse section 50. The secondary orifice track-mass body 32 is disposed within the transverse section 50 of the first orifice track 24, for reciprocating movement transverse to the mount axis 38 along the first track axis 50, as indicated by the arrows 52.

It should be noted, however, that the second orifice track-mass can be located anywhere within the first orifice track 24 and move in other directions relative to the mount axis 38. In other embodiments of our invention, it may be desirable to have the first orifice track 24 define a curvilinear, circular, or other geometric shape. The track-mass 32 may be positioned in a curved section of the first orifice track 24, rather than in a straight section, as is the case in the exemplary embodiments of the invention specifically described herein. Dependent upon the shape and orientation of the first orifice track 24 relative to the mount axis 38, in other embodiments of our invention, the track-mass 32 may reciprocate along an axis that is parallel or coincident with the mount axis 38, or along an axis that is transverse to the mount axis 38 at an angle other than the generally parallel and orthogonal relationship between the transverse section 50 of the first orifice track axis 48 and the mount axis 38 illustrated in the exemplary embodiments expressly disclosed herein.

Figure 4:
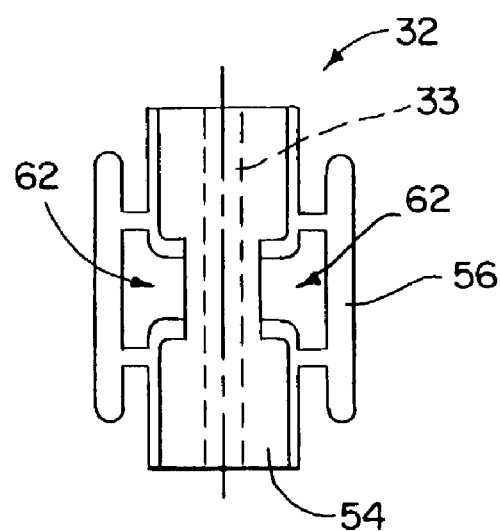
FIG. 4 shows an exemplary embodiment of a secondary track mass, according to our invention, in the mount of FIG. 1.

As shown in FIG. 4, the secondary orifice track-mass body 32 includes an elongated central member 54 defining the through bore 33. The central member 54 of the exemplary embodiment is fabricated from a material such as nylon. The central member 54 is bonded to a resilient tethering member 56, of a material such as natural rubber molded around the central member 54. The secondary track-mass body 32 is configured to have a vertical dimension that fits closely to the top and bottom walls of the first orifice track 24, to provide a sliding seal between the track-mass body 32 and the top and bottom surfaces of the wall 26 of the first orifice track 24, so that substantially all fluid flowing between the primary and secondary fluid chambers 14, 16 of the mount 10 must pass through the through-hole 33 forming the second orifice track.

Figure 5:
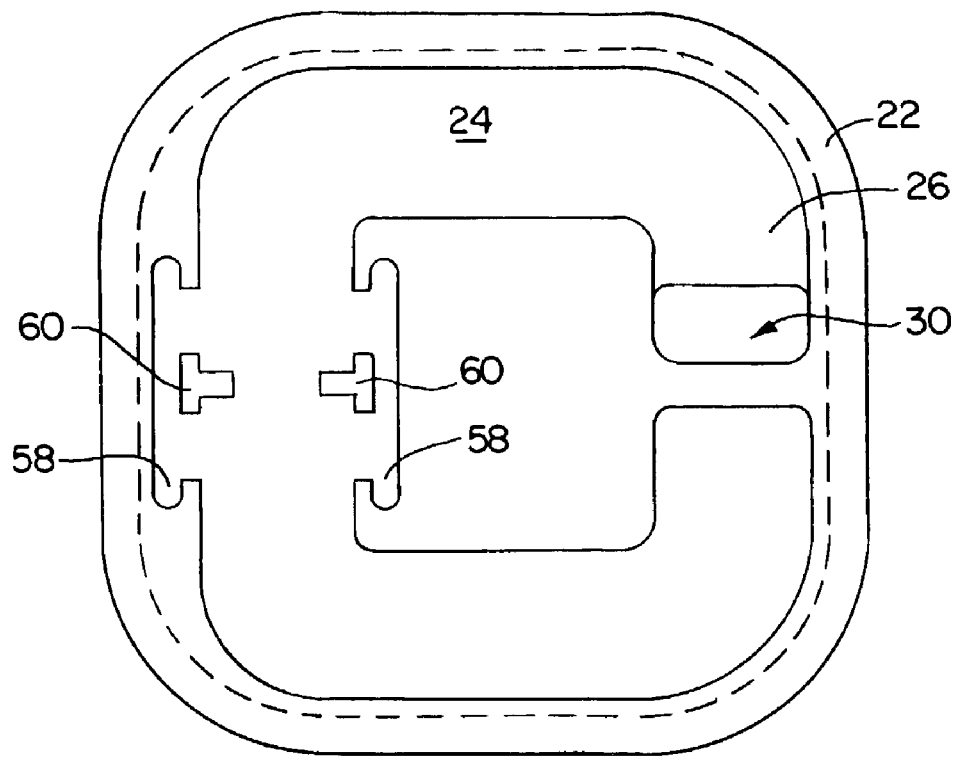
FIG. 5 shows a lower track plate that forms part of the partition shown in FIG. 2.
Figure 6:
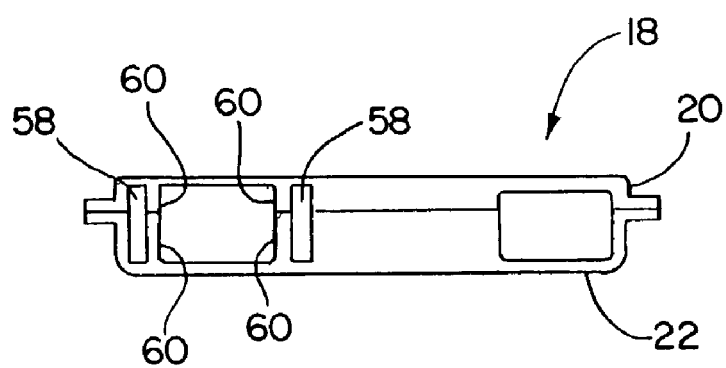
FIG. 6 shows a cross section of the partition of FIG. 2, without the secondary track-mass body.

As shown in FIGS. 5 and 6, the upper and lower track plates 20, 22 define complimentary recesses 58 for receiving the resilient tethering member 56 of the track-mass body 32. As shown in FIGS. 2, 5 and 6, the mount 10 includes stops, in the form of T-shaped stop posts 60 extending from the upper and lower track plates 20, 22, into the recesses 58 and first orifice track 24, for limiting the reciprocating movement of the secondary orifice track-mass body 32 within the first orifice track 24.

As seen in FIGS. 2–4, the secondary track-mass body 32 includes a pair of vertical openings 62, or through slots, for passage of the stop posts 60. The openings 62 and stop posts 60 are configured in a complimentary manner to provide sufficient clearance in the openings 62 for the secondary track-mass body 32 to oscillate in a reciprocating manner as indicated by the arrows 52 along the transverse section 50 of the first orifice track 24, over a linear distance predetermined by the amount of clearance in the openings 62, i.e. the length of the slots. The resilient tethering member 56 of the secondary track-mass body 32 provides a fluid seal between the wall 26 of the first orifice track 24 and the secondary track-mass body 32, while allowing reciprocating movement of the secondary track-mass body 32 within the first orifice track 24.

By virtue of the structure described above, when an oscillating load of small amplitude is applied to the mount 10 through the first and second attachment devices 34, 36, the secondary orifice track-mass body 32 and second orifice track 33 reciprocate with fluid movement in the first orifice track 24. Resistance to fluid flow through the through-hole 33 is great enough, due to the through-hole being of smaller cross sectional flow area than the first orifice track 24, and fluid friction and viscosity induced forces resisting fluid flow through the elongated length of the through-hole 33, that there is little if any fluid flow through the through-hole 33. In this mode of operation, our mount is well suited for providing lower dynamic stiffness at higher frequencies for improved isolation of low amplitude vibrations, such as those produced by an automobile engine at idle or during sustained constant speed operation.

Should a large amplitude input be applied to the mount through the first and second attachment devices 34, 36, however, the volume of fluid flowing between the first and second fluid chambers 14, 16 rises to a point that the ends of the openings in the secondary track-mass body 32 contact the stop posts 60, and the fluid must flow through the through-hole 33 in traveling through the first and second orifice tracks 24, 33 between the primary and secondary fluid chambers 14, 16. In this mode of operation, the dynamic stiffness of the mount 10 is increased significantly, and provides a mount 10 that is well suited to damping low frequency, large amplitude, vibrations, such as those that must be dealt with when an automobile having a resiliently mounted engine encounters a bump in the road causing the engine to bounce with respect to the automobile chassis.

By judicious design of the components described above, a mount 10 according to our invention provides reciprocating movement of the secondary orifice track-mass body 32 and second orifice track 33, with fluid movement in the first orifice track 24, above a first desired resonant frequency of the mount 10, and fluid communication for passage of fluid between the primary and secondary fluid chambers 14, 16 at a second desired resonant frequency of the mount 10 below the first resonant frequency of the mount 10. A mount 10, according to our invention, is thus well suited for providing a passive rate dip type of engine mount.

While the embodiments of our invention disclosed herein are presently considered to be preferred, various changes and modifications can be made without departing from the spirit and scope of the invention.

For example, in the exemplary form of the mount 10 according to our invention, oriented as depicted in FIGS. 1–6, the first orifice track 24 defines a generally rectangular shaped cross section thereof in the transverse section 50 of the first orifice track 24, with the rectangular shaped cross-section defining an upper and a lower wall connected by a pair of spaced side walls, and the secondary orifice track-mass 32 includes upper and lower surfaces respectively thereof in sliding contact with the upper and lower surfaces of the first orifice track 24, and a pair of spaced side surfaces thereof connected to the side walls of the first orifice track by the imperforate resilient tethering members 56. In other forms of our invention, however, other cross sectional shapes and tethering configurations may also be utilized.

Also, in the exemplary forms described herein, the upper and lower track plates 20, 22 have a slightly different height. In other forms of our invention, however, it may be preferable to have the upper and lower track plates 20, 22 be identical, to reduce the number of component parts required to fabricate the mount 10.

The various elements and aspects of our invention may also be used independently from one another, or in different combinations or orientations than are described above and in the drawing with regard to the exemplary embodiment. The first and second attachment devices 34, 36 may take many other forms, and can be oriented at an angle to one another and/or the mount axis 36 to facilitate use of our invention in a wide range of applications. We also expressly emphasize that our invention may be practiced in mounts providing resilient support of a wide variety of masses, in addition to the automotive engine mounts described herein.

The scope of the invention is indicated in the appended claims. We intend that all changes or modifications within the meaning and range of equivalents are embraced by the claims.

We claim:

1. A hydraulic mount comprising:
   a resilient hollow body defining a primary and a secondary fluid chamber separated from one another by a partition having a first orifice track therein providing fluid communication between the primary and secondary fluid chambers, the first orifice track having a wall thereof defining a first opening into the primary fluid chamber and a second opening into the secondary fluid chamber;
   a first and a second attachment device disposed along a mount axis extending through the resilient hollow body for receiving a load;
   the first orifice track defining a first track axis extending between the first and second openings and including a transverse section thereof wherein the first track axis extends transverse to the mount axis; and
   a secondary orifice track-mass body disposed within the transverse section of the first orifice track and sealed to the wall of the first orifice track by a resilient tethering member for limited reciprocating movement within the transverse section of the first orifice track, the secondary orifice track-mass body defining a second orifice track therein providing fluid communication through the secondary orifice track-mass body for passage of fluid received from the first fluid orifice track; wherein
   the first orifice track defines a generally rectangular shaped cross section thereof in the transverse section of the first orifice track, the rectangular shaped cross-section having an upper and a lower wall connected by a pair of spaced side walls; and
   the secondary orifice track-mass includes upper and lower surfaces respectively thereof in sliding contact with the upper and lower surfaces of the first orifice track, and a pair of spaced side surfaces thereof connected to the side walls of the first orifice track by imperforate resilient tethers.

2. The hydraulic mount of claim 1 wherein the partition is comprised of an upper and a lower plate mating with one another to form the first orifice track.

3. The hydraulic mount of claim 2 wherein the upper and lower plates are identical.

4. The hydraulic mount of claim 1 wherein:
   the first orifice track defines an effective orifice area of the first track; and
   the secondary orifice track-mass body includes an orifice extending therethrough for passage of fluid through the secondary orifice track-mass body, the orifice in the secondary orifice track-mass body defining an effective orifice area smaller than the effective orifice area of the first track.

5. The hydraulic mount of claim 4 further including a stop for limiting the reciprocating movement of the secondary orifice track-mass body within the first orifice track.

6. The hydraulic mount of claim 5 wherein the stop extends from one of the top and bottom walls of the first orifice track, and the secondary orifice track-mass body includes a slot therein having a major axis extending parallel to the first track axis and defining a first and a second end of the slot adapted for bearing against the stop.

7. The hydraulic mount of claim 6 wherein:
   the stop defines an axial dimension thereof in a direction parallel to the slot axis; and
   the first and second ends of the slot are spaced apart by a slot length greater than the axial dimension of the stop in a direction parallel to the slot axis.

8. The hydraulic mount of claim 7 wherein:
   above a first resonant frequency of the mount, the secondary orifice track-mass body and second orifice track reciprocate with fluid movement in the first orifice track, with the slot allowing the secondary orifice track-mass to reciprocate with fluid movement without the first and second ends of the slot contacting the stop; and
   at a second resonant frequency below the first resonant frequency of the mount, at least one of the first and second ends of the slot in the secondary orifice track-mass body contacts the stop for restraining the secondary orifice track-mass body against further reciprocating movement with respect to the first orifice track, and the second orifice providing fluid communication for passage of fluid between the primary and secondary fluid chambers of the mount.

* * * * *